United States Patent
Shimizu et al.

(10) Patent No.: US 11,309,137 B2
(45) Date of Patent: *Apr. 19, 2022

(54) ELECTRODE FOR ALUMINIUM ELECTROLYTIC CAPACITOR, AND PRODUCTION METHOD THEREFOR

(71) Applicant: NIPPON LIGHT METAL COMPANY, LTD., Tokyo (JP)

(72) Inventors: Yuta Shimizu, Shizuoka (JP); Shuhei Enoki, Shizuoka (JP); Masahiko Katano, Shizuoka (JP); Toshifumi Taira, Osaka (JP); Kazuya Fujimoto, Osaka (JP); Shinya Sone, Osaka (JP)

(73) Assignee: NIPPON LIGHT METAL COMPANY, LTD, Tokyo (JP)

( * ) Notice: Subject to any disclaimer, the term of this patent is extended or adjusted under 35 U.S.C. 154(b) by 212 days.

This patent is subject to a terminal disclaimer.

(21) Appl. No.: 16/483,407

(22) PCT Filed: Dec. 7, 2017

(86) PCT No.: PCT/JP2017/044002
§ 371 (c)(1),
(2) Date: Aug. 2, 2019

(87) PCT Pub. No.: WO2018/146932
PCT Pub. Date: Aug. 16, 2018

(65) Prior Publication Data
US 2019/0362902 A1    Nov. 28, 2019

(30) Foreign Application Priority Data
Feb. 9, 2017 (JP) .............................. JP2017-022060

(51) Int. Cl.
*H01G 9/045* (2006.01)
*H01G 9/025* (2006.01)
*H01G 9/055* (2006.01)

(52) U.S. Cl.
CPC .............. *H01G 9/045* (2013.01); *H01G 9/025* (2013.01); *H01G 9/055* (2013.01)

(58) Field of Classification Search
CPC ............................... H01G 9/045; H01G 9/055
See application file for complete search history.

(56) References Cited

U.S. PATENT DOCUMENTS

| 2008/0094775 | A1* | 4/2008 | Sneh | ................ H01G 4/32 361/275.3 |
| 2020/0227209 | A1* | 7/2020 | Enoki | .................... H01G 9/048 |

FOREIGN PATENT DOCUMENTS

| JP | H06-342740 A | 12/1994 |
| JP | H09-275040 A | 10/1997 |

(Continued)

OTHER PUBLICATIONS

WIPO, International Search Report for PCT Patent Application No. PCT/JP2017/044002, Mar. 6, 2018.

(Continued)

*Primary Examiner* — Eric W Thomas (57) ABSTRACT

An electrode for an aluminum electrolytic capacitor and a method for producing the same are provided that enable improvement of water resistance of a chemical formation film having a withstand voltage of 400 V or higher.

The electrode for an aluminum electrolytic capacitor is produced by performing a hydration step of bringing the aluminum electrode into contact with a hydration treatment liquid having a temperature of 78° C. to 92° C. to form a hydrated film on the aluminum electrode and a chemical formation step of performing chemical formation at a chemical formation voltage of 400 V or higher in a chemical formation solution having a temperature of 58° C. to 78° C. to form the chemical formation film on the aluminum electrode. In this method, the amount of the hydrated film is made appropriate. In this electrode for an aluminum elec- (Continued)

trolytic capacitor, the number of voids that are exposed on a cut surface when the chemical formation film is cut is 150 voids/$\mu m^2$ or smaller, and thus the water resistance thereof is high.

9 Claims, 5 Drawing Sheets

(56) References Cited

FOREIGN PATENT DOCUMENTS

| JP | 2003-193260 A | 7/2003 |
|---|---|---|
| JP | 2007-184301 A | 7/2007 |
| JP | 2007-324151 A | 12/2007 |
| JP | 2014-57000 A | 3/2014 |

OTHER PUBLICATIONS

WIPO, Written Opinion for PCT Patent Application No. PCT/JP2017/044002, Mar. 6, 2018.

* cited by examiner

ELECTRODE FOR ALUMINIUM ELECTROLYTIC CAPACITOR, AND PRODUCTION METHOD THEREFOR

FIELD

The present invention relates to an electrode for an aluminum electrolytic capacitor having an aluminum electrode on which a chemical formation film is formed and a method for producing the same.

BACKGROUND

In a process of producing anode foil for an aluminum electrolytic capacitor, an aluminum electrode having a porous layer is immersed into a hydration treatment liquid such as hot pure water to form a hydrated film on a surface of the aluminum electrode (hydration step), and then chemical formation is performed thereon in a chemical formation solution containing organic acid, inorganic acid, and salts thereof (chemical formation step), whereby a chemical formation film made of aluminum oxide is formed on the surface. By forming the hydrated film before the chemical formation step, the amount of electricity required for the chemical formation can be reduced, and also the electrostatic capacitance per unit area can be improved (see Patent Literature 1).

CITATION LIST

Patent Literature

Patent Literature 1: Japanese Unexamined Patent Publication No. 2014-57000

SUMMARY

Technical Problem

In the chemical formation film formed when the chemical formation is performed at a chemical formation voltage of 400 V or higher after the hydration step, many defects exist that are voids having a diameter of several nanometers to several tens of nanometers. It is thought that these defects are generated due to volumetric shrinkage when the hydrated film is dehydrated to become aluminum oxide. The chemical formation film in which these defects exist has a weak point that the chemical formation film tends to deteriorate due to hydration because water can easily enter the defects from the surface.

As a result of various studies made by the inventors of the present invention on these defects, it was found that, when the chemical formation is performed after the hydration step, such defects start to be generated at a voltage of 300 V or higher, and this generation becomes noticeable particularly at 400 V or higher and more particularly at 500 V or higher. Furthermore, as a result of repeated experiments and examinations made by the inventors of the present invention, it was found that, when the chemical formation is performed at a voltage of 300 V or higher, even if the defects are generated, a chemical formation solution or water penetrates into the defects at the chemical formation step, whereby the defects are subjected to the chemical formation again to be repaired. It was also found that, when the chemical formation is performed at a voltage of 400 V or higher, heat generated in the chemical formation film becomes intense, which causes a chemical formation solution or water to boil and evaporate at a surface of the film before the chemical formation solution or the water penetrates into the defects at the chemical formation step, thereby making repair of the defects difficult.

In view of the above-described problems, it is an object of the present invention to provide an electrode for an aluminum electrolytic capacitor and a method for producing the same that enable improvement of water resistance of a chemical formation film having a withstand voltage of 400 V or higher.

Solution to Problem

In order to solve the above problems, the present invention is directed to an electrode for an aluminum electrolytic capacitor, the electrode having an aluminum electrode on which a chemical formation film having a withstand voltage of 400 V or higher is formed, in which the number of voids that are exposed on a cut surface when the chemical formation film is cut is 150 voids/$\mu m^2$ or smaller.

In the present invention, the number of voids (defects) that are exposed on a cut surface when the chemical formation film is cut is 150 voids/$\mu m^2$ or smaller, and thus the number of the defects in the chemical formation film is small. Because this makes water less likely to enter from the surface of the chemical formation film, the chemical formation film is less likely to undergo deterioration caused by hydration, whereby the water resistance of the chemical formation film can be improved.

In the present invention, the number of the voids is preferably 100 voids/$\mu m^2$ or smaller.

A method for producing an electrode for an aluminum electrolytic capacitor according to the present invention includes: a hydration step of bringing an aluminum electrode into contact with a hydration treatment liquid having a temperature of 78° C. to 92° C. to form a hydrated film on the aluminum electrode; and a chemical formation step of performing chemical formation at a chemical formation voltage of 400 V or higher in a chemical formation solution having a temperature of 58° C. to 78° C. to form a chemical formation film on the aluminum electrode. In the method, a film withstand voltage Vf (V) and a ratio x wt % satisfy a conditional formula:

$$(0.01 \times Vf) \leq x \leq (0.017 \times Vf + 28)$$

where x wt % is a ratio of the mass of the hydrated film to the mass of the aluminum electrode before the hydration step.

In the method for producing an electrode for an aluminum electrolytic capacitor according to the present invention, based on the finding that water contained in the hydrated film tends to desorb at 60° C. to 90° C., the hydration step is performed at a relatively low temperature of 78° C. to 92° C. This makes the water in the hydrated film less likely to desorb, and thus the hydrated film containing a large amount of water is formed. Accordingly, even if defects (voids) are generated due to volumetric shrinkage when the hydrated film is dehydrated to become aluminum oxide at the chemical formation step, the chemical formation film contains sufficient water, whereby the defects can be effectively repaired at the chemical formation step. Furthermore, because the temperature of the chemical formation solution is set to 58° C. to 78° C. at the chemical formation step, water is less likely to desorb from the hydrated film at the hydration step. This allows the hydrated film to contain sufficient water even in the course of the chemical formation, whereby the defects can be effectively repaired at the chemical formation step. Thus, the number of voids (defects) that are exposed on a cut surface when the chemical formation film is cut can be reduced to 150 voids/µm² or smaller, which makes water less likely to enter from the surface of the chemical formation film. Consequently, the chemical formation film is less likely to undergo deterioration caused by hydration, whereby the water resistance of the chemical formation film can be improved.

In the present invention, the amount of the hydrated film generated at the hydration step is appropriate. Specifically, if the amount of the hydrated film generated at the hydration step is too small, heat generated during the chemical formation becomes greater, which makes repair of the defects difficult at the chemical formation step. In contrast, if the amount of the hydrated film generated at the hydration step is excessively large, the chemical formation solution or water is hindered from penetrating into defects by the thickly formed hydrated film, whereby repair of the defects is hindered. Thus, by the present invention, the number of voids (defects) that are exposed on a cut surface when the chemical formation film is cut can be reduced to 150 voids/µm² or smaller, which makes water less likely to enter from the surface of the chemical formation film. Consequently, the chemical formation film is less likely to undergo deterioration caused by hydration, whereby the water resistance of the chemical formation film can be improved. Herein, such defects can be removed to a certain extent by performing chemical formation again after performing depolarization at the chemical formation step, but cannot be sufficiently removed at a chemical formation voltage of 400 V or higher. This is because defects in an inner area of the film is left behind due to the thickly formed chemical formation film even if the depolarization is performed.

In the present invention, at the chemical formation step, an absolute value |B−A| of a velocity vector B−A preferably satisfies a conditional formula:

$$3 \text{ cm/s} \leq |B-A| \leq 100 \text{ cm/s}$$

where A is a three-dimensional velocity vector of moving velocity of the aluminum electrode, B is a three-dimensional velocity vector of average flow velocity of the chemical formation solution in a range from a surface of the aluminum electrode to a position at 10 centimeters apart therefrom in a direction perpendicular to the surface of the aluminum electrode, B−A is a three-dimensional velocity vector of relative velocity of the chemical formation solution to the aluminum electrode, and |B−A| is the absolute value of the velocity vector B−A. With this constitution, because the relative velocity of the chemical formation solution to the aluminum electrode surface is appropriate, heat generated from the aluminum electrode during the chemical formation can be efficiently dissipated into the chemical formation solution. Thus, even when the chemical formation voltage is 400 V or higher, at the chemical formation step, the chemical formation solution or water can penetrate into defects in the chemical formation film, whereby the defects are repaired. Consequently, the electrostatic capacitance is high and the number of defects in the chemical formation film is small, and thus the chemical formation film is less likely to undergo deterioration caused by hydration. Herein, if |B−A| is smaller than 3 cm/s, the defects in the chemical formation film cannot be sufficiently repaired and the electrode for an aluminum electrolytic capacitor has an increased leakage current and tends to deteriorate due to hydration for the reasons that heat from the aluminum electrode surface cannot be sufficiently dissipated and diffusion of ions is insufficient, for example. In contrast, if |B−A| exceeds 100 cm/s, elution of aluminum ions from the aluminum electrode surface becomes excessive, and thus the electrostatic capacitance tends to decrease.

In the present invention, the absolute value |B−A| of the velocity vector preferably satisfies a conditional formula:

$$5 \text{ cm/s} \leq |B-A| \leq 30 \text{ cm/s}.$$

In the present invention, absolute values |A| and |B| of the velocity vectors preferably satisfy conditional formulae:

$$0 \text{ cm/s} \leq |A| \leq 100 \text{ cm/s}$$

$$3 \text{ cm/s} \leq |B| \leq 100 \text{ cm/s}$$

where |A| and |B| are absolute values of the velocity vectors A and B, respectively.

Advantageous Effects of Invention

In the electrode for an aluminum electrolytic capacitor according to the present invention, the number of voids (defects) that are exposed on a cut surface when the chemical formation film is cut is 150 voids/µm² or smaller, and thus the number of the defects in the chemical formation film is small. Because this makes water less likely to enter from the surface of the chemical formation film, the chemical formation film is less likely to undergo deterioration caused by hydration, whereby the water resistance of the chemical formation film can be improved. In the method for producing the electrode for an aluminum electrolytic capacitor according to the present invention, based on the finding that water contained in the hydrated film tends to desorb at 60° C. to 90° C., the hydration step is performed at a relatively low temperature of 78° C. to 92° C. This makes the water in the hydrated film less likely to desorb, and thus the hydrated film containing a large amount of water is formed. Because the temperature of the chemical formation solution is set to 58° C. to 78° C. at the chemical formation step, water is less likely to desorb from the hydrated film at the hydration step. This allows the hydrated film to contain sufficient water, whereby the defects can be effectively repaired at the chemical formation step. Furthermore, the amount of the hydrated film generated at the hydration step is appropriate. Thus, the number of voids (defects) that are exposed on a cut surface when the chemical formation film is cut can be reduced to 150 voids/µm² or smaller, which makes water less likely to enter from the surface of the chemical formation film. Consequently, the chemical formation film is less likely to undergo deterioration caused by hydration, whereby the water resistance of the chemical formation film can be improved.

DESCRIPTION OF EMBODIMENTS (Electrode for Aluminum Electrolytic Capacitor)

In the present invention, for producing an electrode for an aluminum electrolytic capacitor, a surface of an aluminum electrode is subjected to chemical formation to produce the electrode for an aluminum electrolytic capacitor. As the aluminum electrode, etched foil formed by etching aluminum foil, a porous aluminum electrode having porous layers that are formed by sintering aluminum powder and are deposited on both surfaces of an aluminum core material, or the like may be used. The etched foil includes a porous layer in which tunnel-like pits are formed. In the porous aluminum electrode, for example, porous layers 30 each having a thickness of 150 micrometers to 3000 micrometers are each formed on both surfaces of the aluminum core material having a thickness of 10 micrometers to 50 micrometers. Each porous layer is a layer formed by sintering aluminum powder, and the aluminum powder is sintered while pores are being retained with each other.

(Constitution of Aluminum Electrolytic Capacitor)

In order to produce an aluminum electrolytic capacitor using the aluminum electrode after chemical formation (the electrode for an aluminum electrolytic capacitor), for example, a capacitor element is formed by winding anode foil made of the aluminum electrode after chemical formation (the electrode for an aluminum electrolytic capacitor) and cathode foil with a separator interposed therebetween. Subsequently, the capacitor element is impregnated with an electrolytic solution (a paste). Thereafter, the capacitor element including the electrolytic solution is placed in an outer case, and the case is sealed with a sealing body. In the aluminum electrolytic capacitor having the constitution described above, when the water resistance of the chemical formation film is low, the chemical formation film may deteriorate due to water contained in the air during a period when the electrode for an aluminum electrolytic capacitor is stored, and consequently the characteristics of the aluminum electrolytic capacitor may deteriorate. Furthermore, after the aluminum electrolytic capacitor has been produced, if the chemical formation film deteriorates due to the water contained in the electrolytic solution, the reliability of the aluminum electrolytic capacitor decreases. Thus, the electrode for an aluminum electrolytic capacitor is required to have a high water resistance.

When a solid electrolyte is used instead of the electrolytic solution, a solid electrolyte layer is formed on the surface of the anode foil made of the aluminum electrode after chemical formation (the electrode for an aluminum electrolytic capacitor) and then a cathode layer is formed on the surface of the solid electrolyte layer. Thereafter, the obtained product is sheathed with resin or the like. In this process, an anode terminal to be electrically connected to the anode and a cathode terminal to be electrically connected to the cathode are provided. In this case, a plurality of pieces of anode foil may be laminated. In the aluminum electrolytic capacitor having the constitution described above, when the water resistance of the electrode for an aluminum electrolytic capacitor is low, the chemical formation film may deteriorate due to water entering through a sheath such as resin, and thus the electrode for an aluminum electrolytic capacitor is required to have a high water resistance.

(Electrode for Aluminum Electrolytic Capacitor)

Figure 1A:
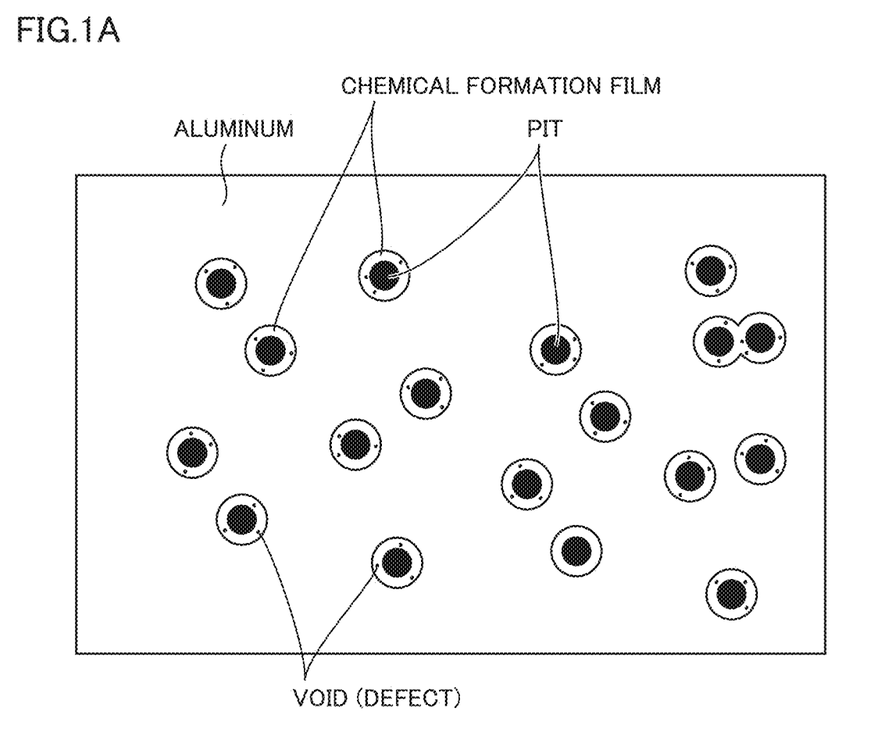
FIG. 1A and FIG. 1B are explanatory diagrams illustrating a method for examining voids (defects) in a chemical formation film of an electrode for an aluminum electrolytic capacitor.
Figure 1B:
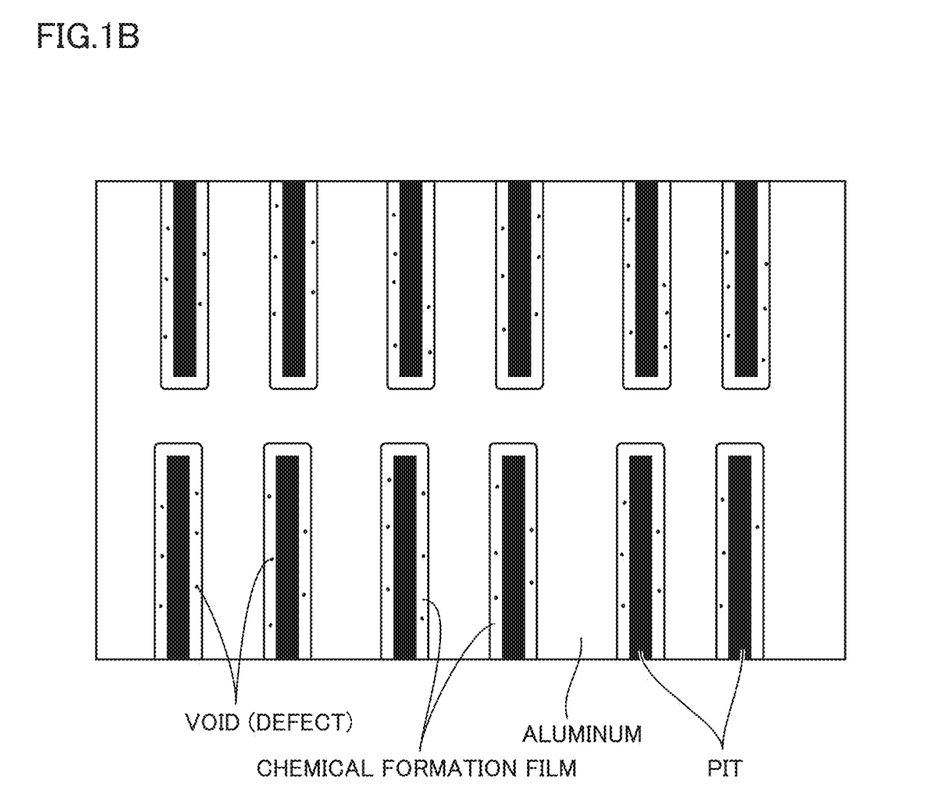
Figure 2:
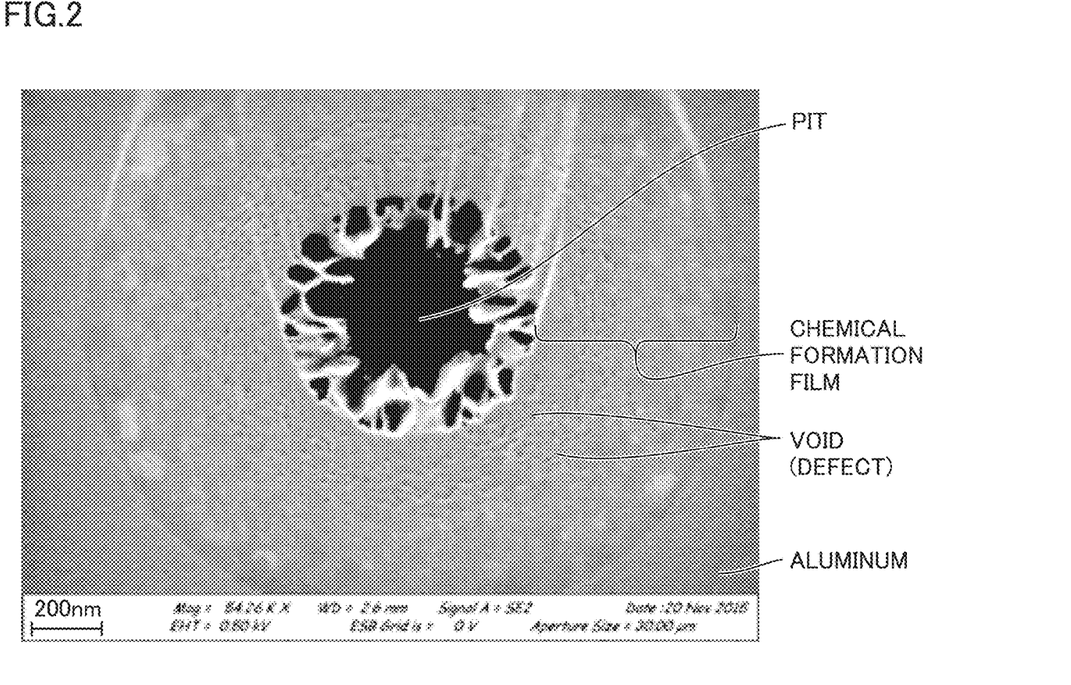
FIG. 2 is an explanatory diagram of the voids (defects) in the chemical formation film of the electrode for an aluminum electrolytic capacitor.

FIG. 1A and FIG. 1B are explanatory diagrams illustrating a method for examining voids (defects) in a chemical formation film of an electrode for an aluminum electrolytic capacitor. FIG. 2 is an explanatory diagram of the voids (defects) in the chemical formation film on the electrode for an aluminum electrolytic capacitor. In FIG. 2, in order for the presence of voids to be easily identified, a photograph of a cross section of a chemical formation film in which many voids are present, which was observed with a FE-SEM, is illustrated.

In the electrode for an aluminum electrolytic capacitor, when many voids (defects) are present in the chemical formation film, the chemical formation film tends to deteriorate due to hydration because water can easily enter from the surface. Thus, when the chemical formation film has fewer defects, the water resistance of the electrode for an aluminum electrolytic capacitor is higher. In view of this, in the present embodiment, the number of voids in the chemical formation film is controlled to be equal to or smaller than a predetermined value, as will be described with reference to FIG. 1A, FIG. 1B, and FIG. 2. More specifically, the number of voids in the chemical formation film is controlled to be equal to or smaller than the predetermined value by controlling the number of voids that are exposed on a cut surface when the chemical formation film of the electrode for an aluminum electrolytic capacitor is cut to be equal to or smaller than the predetermined value.

FIG. 1(a) and FIG. 2 illustrate a case in which, along a surface of an electrode for an aluminum electrolytic capacitor including a chemical formation film formed on etched foil, the chemical formation film is cut, and tunnel-like pits are indicated as black areas. Around each pit, the chemical formation film is present. As illustrated in FIG. 2, because voids (defects) are exposed on the cut surface of the chemical formation film, the number of the voids per 1 $\mu m^2$ can be measured.

Herein, the chemical formation film may be cut along pits as illustrated in FIG. FIG. 1B. In this case also, voids (defects) are exposed on the cut surface of the chemical formation film, and thus the number of voids per 1 $\mu m^2$ can be measured.

In the present embodiment, the number of voids that are exposed on a cut surface when the chemical formation film of the electrode for an aluminum electrolytic capacitor is cut is set to 150 voids/$\mu m^2$ or smaller. Thus, the chemical formation film has a smaller number of defects. Consequently, water is less likely to enter from the surface of the chemical formation film, and thus the chemical formation film is less likely to undergo deterioration caused by hydration and the water resistance thereof is high. Herein, the number of voids is more preferably 100 voids/$\mu m^2$ or smaller, and in this embodiment, the water resistance of the electrode for an aluminum electrolytic capacitor can be significantly improved.

(Method for Producing Electrode for Aluminum Electrolytic Capacitor)

In a method for producing the electrode for an aluminum electrolytic capacitor of the present embodiment, a hydration step of bringing an aluminum electrode into contact with a hydration treatment liquid such as pure water to form a hydrated film on the aluminum electrode and a chemical formation step of performing chemical formation on the aluminum electrode at a chemical formation voltage of 400 V or higher in a chemical formation solution to form a chemical formation film on the aluminum electrode are performed. In the present embodiment, at the hydration step, the aluminum electrode is immersed in pure water (hydration treatment liquid) having a temperature of 78° C. to 92° C. to form a hydrated film. At the chemical formation step, the aluminum electrode is subjected to the chemical formation at a chemical formation voltage of 400 V or higher in a chemical formation solution having a temperature of 58° C. to 78° C.

In this method for producing, when the chemical formation step is performed after the hydration step, the chemical formation film is formed by both of dehydration reaction of the hydrated film and anodic oxidation reaction of aluminum. In the dehydration reaction of the hydrated film, the volume of the film shrinks due to desorption of water, whereby voids (defects) are generated. Some of these defects are repaired by the anodic oxidation reaction, but are not repaired if the chemical formation solution or water does not exist in the defects. Thus, defects that have not been repaired finally remain in the chemical formation film, which causes an increased leakage current or a reduced hydration resistance. As a result of in-depth observations of chemical formation films made by the inventors of the present invention, it was found that the sizes of defects in the chemical formation film are several nanometers to several tens of nanometers, and such defects are generated more particularly when chemical formation is performed at up to a withstand voltage of 400 V or higher. Furthermore, it was found that more defects are generated when the liquid temperature at the hydration step is higher and the temperature of the chemical formation solution is higher.

More specifically, it was found that water contained in the hydrated film desorbs in three stages of about 60° C. to 90° C., 95° C. to 150° C., and 200° C. to 450° C. When the aluminum electrode is boiled in boiling pure water as in the conventional art, the contained water desorbs. Thus, even when the same amount of aluminum is caused to react, the amount of water contained in the hydrated film decreases. This causes shortage of water contained in the chemical formation film at the subsequent chemical formation step, and consequently the defects cannot be sufficiently repaired. Whereas, in the present invention, because the hydration step is performed at a relatively low temperature of 78° C. to 92° C., water in the hydrated film is less likely to desorb, and thus the hydrated film containing a larger amount of water is formed. Consequently, at the subsequent chemical formation step, the defects can be effectively repaired because the chemical formation film contains sufficient water.

At the chemical formation step, the temperature of the chemical formation solution is set to 58° C. to 78° C., and thus water is less likely to desorb from the hydrated film. Consequently, the defects can be effectively repaired because the chemical formation film contains sufficient water.

Thus, the number of voids that are exposed on a cut surface when the chemical formation film is cut can be reduced to 150 voids/$\mu m^2$ or smaller, preferably to 100 voids/$\mu m^2$ or smaller, whereby the water resistance of the electrode for an aluminum electrolytic capacitor can be improved.

Herein, such defects can be removed to a certain extent by performing chemical formation again after performing depolarization, but cannot be sufficiently removed at a chemical formation voltage of 400 V or higher. This is because defects in an inner area of the film is left behind due to the thickly formed chemical formation film even if the depolarization is performed. Whereas, in the present embodiment, even when the chemical formation film is formed at a chemical formation voltage of 400 V or higher, the defects can be reduced, and the water resistance of the electrode for an aluminum electrolytic capacitor can be improved.

(Amount of Hydrated Film)

Figure 3:
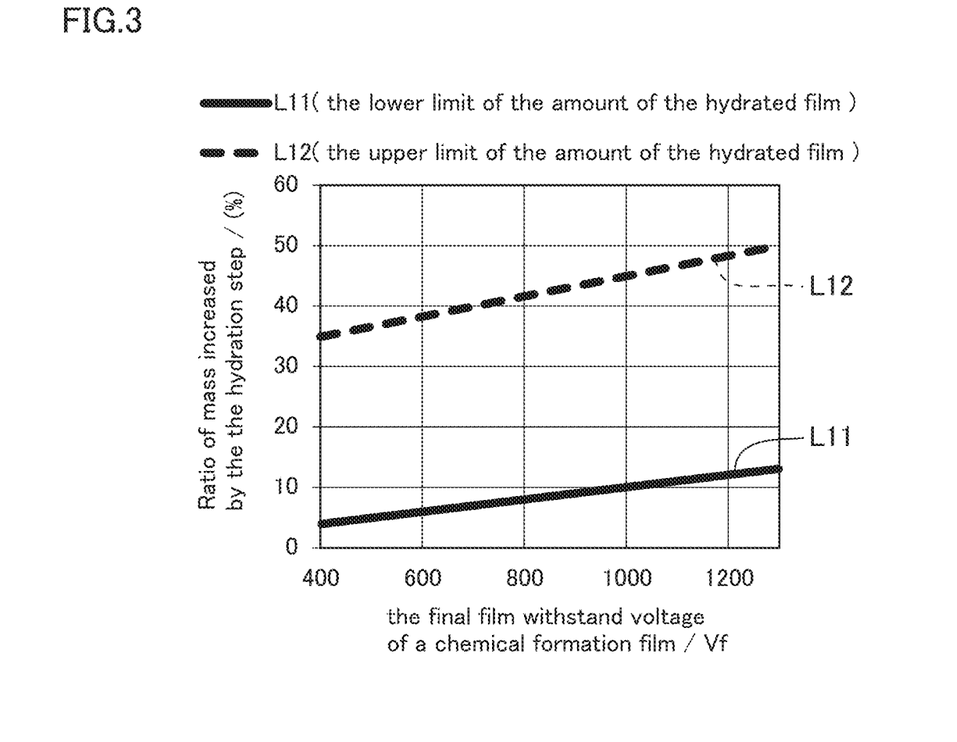
FIG. 3 is a graph illustrating a range of an appropriate amount of a hydrated film to be generated at a hydration step in a method for producing the electrode for an aluminum electrolytic capacitor to which the present invention is applied.

FIG. 3 is a graph illustrating a range of an appropriate amount of a hydrated film to be generated at the hydration step in the method for producing the electrode for an aluminum electrolytic capacitor to which the present invention is applied. In the present embodiment, when a ratio x of mass increased by the hydration step is represented by the following formula (Mathematical formula 1), the amount of the hydrated film to be generated at the hydration step is set within a range from the lower limit of x indicated by the solid line L11 in FIG. 1 to the upper limit of x indicated by the broken line L12 in FIG. 1.

[Mathematical formula 1]

$$\text{Ratio } x (\%) \text{ of mass increased by the hydration step} = \frac{\text{Mass (g) increased by the hydration step}}{\text{Mass (g) of aluminum electrode before pure water boiling}} \times 100 = \frac{\left(\begin{array}{c}\text{Mass (g) of aluminum electrode}\\ \text{after pure water boiling}\end{array}\right) - \left(\begin{array}{c}\text{Mass (g) of aluminum electrode}\\ \text{before pure water boiling}\end{array}\right)}{\left(\begin{array}{c}\text{Mass (g) of aluminum electrode}\\ \text{before pure water boiling}\end{array}\right)} \times 100$$

More specifically, when the final film withstand voltage of a chemical formation film is represented by Vf (V) and the ratio of mass increased by the hydration step is represented by x, the solid line L11 indicating the lower limit of x is represented by the following formula.

$$x = (0.01 \times Vf)$$

The broken line L12 indicating the upper limit of x is represented by the following formula.

$$x = (0.017 \times Vf + 28)$$

Thus, in the present embodiment, conditions of the hydration step are set such that the film withstand voltage Vf (V) and the ratio x (mass %) satisfy the following conditional formula.

$$(0.01 \times Vf) \le x \le (0.017 \times Vf + 28)$$

With this constitution, the amount of the hydrated film generated at the hydration step is appropriate, and thus the defects can be reduced. Specifically, when the amount of the hydrated film generated at the hydration step is smaller than the lower limit of the above conditional formula, heat generated during the chemical formation becomes greater, which makes repair of the defects difficult. In contrast, if the amount of the hydrated film generated at the hydration step is larger than the upper limit of the above conditional formula, the chemical formation solution or water is hindered from penetrating into defects by the thickly formed hydrated film, whereby repair of the defects is hindered. Thus, if the above condition is satisfied, the number of voids that are exposed on a cut surface when the chemical formation film is cut can be reduced to 150 voids/$\mu m^2$ or smaller, and preferably to 100 voids/$\mu m^2$ or smaller, whereby the water resistance of the electrode for an aluminum electrolytic capacitor can be improved.

(Chemical Formation Step)

Figure 4:
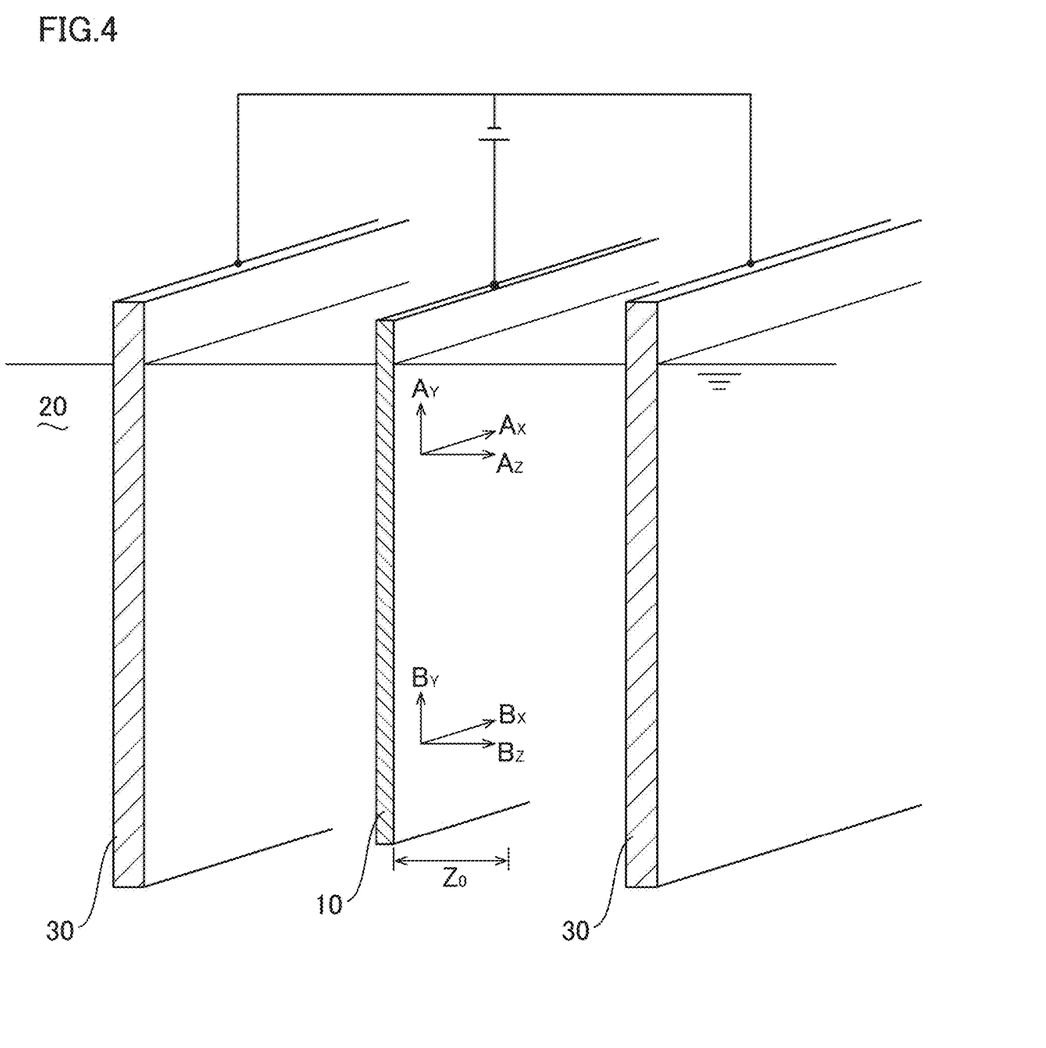
FIG. 4 is an explanatory diagram schematically illustrating a chemical formation step for the electrode for an aluminum electrolytic capacitor to which the present invention is applied.

FIG. 4 is an explanatory diagram schematically illustrating a chemical formation step for the electrode for an aluminum electrolytic capacitor to which the present invention is applied. At the chemical formation step, as illustrated in FIG. 4, for example, the aluminum electrode 10 is immersed in a chemical formation solution 20 stored in a chemical formation tank (not illustrated). In the chemical formation solution 20, a pair of counter electrodes 30 are disposed, and both surfaces of the aluminum electrode 10 face the respective counter electrodes 30. In this state, chemical formation is performed with the aluminum electrode 10 used as an anode and the counter electrodes 30 used as cathodes, whereby the aluminum electrode 10 is subjected to the chemical formation. Consequently, on both surfaces of the aluminum electrode 10, aluminum oxide (chemical formation films) is formed. At this time, part of the hydrated film formed at the hydration step is dehydrated to become aluminum oxide, and is included in part of the chemical formation film.

At this chemical formation step, as the chemical formation solution 20, for example, an aqueous solution of an organic acid such as adipic acid or a salt thereof is used. For example, in an aqueous solution (organic acid-based chemical formation solution 20) containing an organic acid such as adipic acid or a salt thereof and having a specific resistance of 5 $\Omega m$ to 500 $\Omega m$ measured at 50° C., the aluminum electrode 10 is subjected to the chemical formation under a condition of a liquid temperature of 40° C. to 90° C. In this process, the power supply voltage applied between the aluminum electrode 10 and each counter electrode 30 is raised until the power supply voltage reaches the final chemical formation voltage Vf, and then the power supply voltage is maintained at the chemical formation voltage Vf.

Instead of the chemical formation solution 20 using an organic acid such as adipic acid or a salt thereof, an aqueous solution containing an inorganic acid such as boric acid or phosphoric acid or a salt thereof may be used as the chemical formation solution 20. For example, in an aqueous solution (inorganic acid-based chemical formation solution 20) containing an inorganic acid such as boric acid or phosphoric acid or a salt thereof and having a specific resistance of 10 $\Omega m$ to 1000 $\Omega m$ measured at 90° C., the aluminum electrode 10 is subjected to the chemical formation under a condition of a liquid temperature of 40° C. to 95° C.

Alternatively, until the final chemical formation voltage Vf is reached, the chemical formation may be performed in the chemical formation solution 20 using an organic acid such as adipic acid or a salt thereof, and then the chemical formation voltage Vf may be maintained (constant-voltage chemical formation) in the chemical formation solution 20 using an inorganic acid such as boric acid or phosphoric acid or a salt thereof.

When either of these chemical formation solutions 20 is used, in the course of the chemical formation step, depolarization treatment such as thermal depolarization treatment of heating the aluminum electrode 10 and in-liquid depolarization treatment of immersing the aluminum electrode 10 in an aqueous solution containing phosphate ions, for example, is performed. In the thermal depolarization treatment, for example, the treatment temperature is 450° C. to 550° C., and the treatment time is 2 minutes to 10 minutes. In the in-liquid depolarization treatment, the aluminum electrode 10 is immersed in an aqueous solution of 20 mass % to 30 mass % phosphoric acid for 5 minutes to 15 minutes depending on the film withstand voltage under a condition of a liquid temperature of 60° C. to 70° C. In the in-liquid depolarization treatment, no voltage is applied to the aluminum electrode 10.

In the course of voltage rise of the power supply voltage to the chemical formation voltage, a phosphoric acid immersion step of immersing the aluminum electrode 10 in an aqueous solution containing phosphate ions may be performed. At this phosphoric acid immersion step, the aluminum electrode 10 is immersed in a phosphoric acid aqueous solution having a liquid temperature of 40° C. to 80° C. and having a specific resistance of 0.1 $\Omega m$ to 5 $\Omega m$ measured at 60° C. for a period of 3 minutes to 30 minutes. By this phosphoric acid immersion step, aluminum hydroxide precipitated at the chemical formation step can be efficiently removed, and the subsequent generation of aluminum hydroxide can be reduced. In addition, phosphate ions can be taken into the chemical formation film by the phosphoric acid immersion step, and thus the stability of the chemical formation film such as being able to improve durability for immersion in boiling water or acidic solution can be effectively improved.

(Relative Velocity of Chemical Formation Solution to Aluminum Electrode)

In the present embodiment, when the chemical formation step is performed in the state illustrated in FIG. 2, the aluminum electrode 10 and the chemical formation solution 20 are maintained stationary, or are maintained in a state of being moved. Performing the chemical formation while the aluminum electrode 10 is being moved is to perform the chemical formation while the aluminum electrode 10 that is in a state of being immersed in the chemical formation solution 20 is being moved. Performing the chemical formation while the chemical formation solution 20 is being moved is to perform the chemical formation while the chemical formation solution 20 in which the aluminum electrode 10 is immersed is being moved by circulation or stirring.

In the present embodiment, when the moving velocity of the aluminum electrode 10 is represented by a three-dimensional velocity vector A, the average flow velocity of the chemical formation solution 20 in a range $Z_0$ from a surface of the aluminum electrode 10 to a position at 10 centimeters apart therefrom in a direction perpendicular to the surface of the aluminum electrode 10 is represented by a three-dimensional velocity vector B, the relative velocity of the chemical formation solution 20 to the aluminum electrode 10 is represented by a three-dimensional velocity vector B−A, and the absolute value of the velocity vector B−A is represented by |B−A|, the absolute value |B−A| of this velocity vector satisfies the following conditional formula.

$$3 \text{ cm/s} \leq |B-A| \leq 100 \text{ cm/s}$$

In the present embodiment, the absolute value |B−A| of the velocity vector satisfies the following conditional formula.

$$5 \text{ cm/s} \leq |B-A| \leq 30 \text{ cm/s}$$

When the absolute values of the velocity vectors A and B are represented by |A| and |B|, respectively, the respective absolute values |A| and |B| of the velocity vectors satisfy the following conditional formulae.

$$0 \text{ cm/s} \leq |A| \leq 100 \text{ cm/s}$$

$$3 \text{ cm/s} \leq |B| \leq 100 \text{ cm/s}$$

Herein, when the chemical formation is performed while the aluminum electrode 10 is maintained stationary, the absolute value |A| of the velocity vector becomes zero.

With this constitution, because the relative velocity of the chemical formation solution to the aluminum electrode surface is appropriate, heat generated from the aluminum electrode during the chemical formation can be efficiently dissipated into the chemical formation solution. Thus, a situation in which the temperature of the chemical formation film becomes high and water in an amount more than required desorbs from the hydrated film can be avoided. Thus, the defects are repaired even when the chemical formation voltage is 400 V or higher. Consequently, the electrode for an aluminum electrolytic capacitor to which the present invention is applied has a high electrostatic capacitance and has a smaller number of defects in the chemical formation film, and is thus less likely to undergo deterioration caused by hydration. Herein, if |B−A| is smaller than 3 cm/s, the defects in the chemical formation film cannot be sufficiently repaired and the electrode for an aluminum electrolytic capacitor has an increased leakage current and tends to deteriorate due to hydration for the reasons that heat from the aluminum electrode surface cannot be sufficiently dissipated and diffusion of ions is insufficient, for example. In contrast, if |B−A| exceeds 100 cm/s, elution of aluminum ions from the aluminum electrode surface becomes excessive, and thus the electrostatic capacitance tends to decrease.

In FIG. 2, among directions extending along both surfaces of the aluminum electrode 10, the lateral direction (horizontal direction) is defined as X-direction, and the up-and-down direction (vertical direction) is defined as Y-direction. The direction in which the aluminum electrode 10 faces the counter electrodes 30 is defined as Z-direction. Thus, the three-dimensional velocity vector A of the moving velocity of the aluminum electrode 10 corresponds to a vector obtained by combining the velocity vector $A_X$ in the X-direction, the velocity vector $A_Y$ in the Y-direction, and the velocity vector $A_Z$ in the Z-direction. The absolute value |A| of the velocity vector A is represented by the following formula.

$$|A|=\sqrt{(A_X^2+A_Y^2+A_Z^2)}$$

The three-dimensional velocity vector B of the moving velocity of the chemical formation solution 20 corresponds to a vector obtained by combining the velocity vector $B_X$ in the X-direction, the velocity vector $B_Y$ in the Y-direction, and the velocity vector $B_Z$ in the Z-direction. The absolute value |B| of the velocity vector B is represented by the following formula.

$$|B|=\sqrt{(B_X^2+B_Y^2+B_Z^2)}$$

The absolute value |B−A| of the three-dimensional velocity vector B−A of the relative velocity of the chemical formation solution 20 to the aluminum electrode 10 is represented by the following formula.

$$|B-A|=\sqrt{((B_X-A_X)^2+(B_Y-A_Y)^2+(B_Z-A_Z)^2)}$$

EXAMPLES

The following describes Examples and other examples of the present invention. Table 1 gives conditions for producing an electrode for an aluminum electrolytic capacitor according to each of Examples 1 and 2 and Comparative Examples 1 and 2 of the present invention. Table 2 gives characteristics of the electrode for an aluminum electrolytic capacitor according to each of Examples 1 and 2 and Comparative Examples 1 and 2 of the present invention.

TABLE 1

|  | Temperature (° C.) of hydration step | Type of chemical formation solution | Temperature (° C.) of chemical formation solution |
|---|---|---|---|
| Example 1 | 83 | Boric acid + boric acid ammonium | 65 |
| Example 2 | 80 | Adipic acid ammonium | 65 |
| Comparative Example 1 | 80 | Boric acid + boric acid ammonium | 85 |
| Comparative Example 2 | 93 | Boric acid + boric acid ammonium | 65 |

TABLE 2

|  | Number of defects (voids/μm$^2$) | Hydration resistance (s) |
|---|---|---|
| Example 1 | 90 | 12 |
| Example 2 | 65 | 8 |
| Comparative Example 1 | 300 | 45 |
| Comparative Example 2 | 250 | 38 |

As given in Table 1, in any of Examples 1 and 2 and Comparative Examples 1 and 2, etched foil of high-purity aluminum the surface area of which had been increased by etching was used as an aluminum electrode. Hydration treatment was performed in pure water at each temperature given in Table 1 such that the ratio of the mass of a hydrated film formed at the hydration step to the mass of an aluminum electrode before the boiling step becomes 20%, and then chemical formation was performed in a chemical formation solution of each type given in Table 1. At this chemical formation step, depolarization treatment by immersion in a phosphoric acid aqueous solution or by heat treatment was performed. The chemical formation voltage was 600 V. The absolute value |B−A| of the three-dimensional velocity vector B−A of the relative velocity of the chemical formation solution to the aluminum electrode was set to 10 cm/s.

Subsequently, the hydration resistance of the aluminum electrode was measured. Measurement results of the hydration resistance are results of measurement according to "The methods of electrode foil for aluminium electrolytic capacitors" provided in EIAJ RC 2364A and, for example, the hydration resistance is given as a period of time (seconds) until the power supply voltage was raised to the film withstand voltage when a constant current was applied after each sample was immersed in pure water at 95° C. or higher for 60±1 minutes. The number of defects per 1 μm$^2$ in each chemical formation film was measured by observing the cross section of the chemical formation film with the FE-SEM and analyzing the image thereof.

In each of Examples 1 and 2, the temperature of the hydration step and the temperature of the chemical formation solution were appropriate, and thus the hydration resistance was excellent. In Comparative Example 1, the temperature of the hydration step was appropriate but the temperature of the chemical formation solution was high, and thus dehydration from the hydrated film increased. Consequently, the chemical formation film had many defects, and thus the hydration resistance deteriorated. In Comparative Example 2, the temperature of the chemical formation solution was appropriate but the temperature of the hydration step was high, and thus the hydrated film contained less water. Consequently, the chemical formation film had many defects, and thus the hydration resistance deteriorated.

Other Embodiments

In Examples described above, etched foil was used as the aluminum electrode. However, also when a porous aluminum electrode formed by sintering aluminum powder and laminating the resultant porous layers onto both surfaces of an aluminum core material, for example, was used, similar results were obtained. Furthermore, as a result of studying various conditions in addition to Examples described above, a result was obtained indicating that defects in the chemical formation film could be reduced if the above conditions were satisfied, even when the chemical formation film was formed at a chemical formation voltage of 400 V or higher.

REFERENCE SIGNS LIST

10 . . . aluminum electrode, 20 . . . chemical formation solution, 30 . . . counter electrode

The invention claimed is:

1. An electrode for an aluminum electrolytic capacitor, the electrode having an aluminum electrode on which a chemical formation film having a withstand voltage of 400 V or higher is formed,
wherein the chemical formation film includes voids and the number of the voids that are exposed on a cut surface of the chemical formation film when the chemical formation film is cut is 150 voids/µm² or smaller, and
the voids included in the chemical formation film are several nanometers to several tens of nanometers in size.

2. The electrode according to claim 1, wherein the number of the voids is 100 voids/µm² or smaller.

3. A method for producing an electrode for an aluminum electrolytic capacitor, the method comprising:
a hydration step of bringing an aluminum electrode into contact with a hydration treatment liquid having a temperature of 78° C. to 92° C. to form a hydrated film on the aluminum electrode; and
a chemical formation step of performing chemical formation at a chemical formation voltage of 400 V or higher in a chemical formation solution having a temperature of 58° C. to 78° C. to form a chemical formation film on the aluminum electrode, wherein
a film withstand voltage Vf (V) and a ratio x wt % satisfy a conditional formula:

$(0.01 \times Vf) \times (0.017 \times Vf + 28)$ where x wt % is a ratio of the mass of the hydrated film to the mass of the aluminum electrode before the hydration step.

4. The method for producing an electrode for an aluminum electrolytic capacitor according to claim 3, wherein
at the chemical formation step, an absolute value |B−A| of the velocity vector B−A satisfies a conditional formula:

$3 \text{ cm/s} \le |B-A| \le 100 \text{ cm/s}$ where A is a three-dimensional velocity vector of moving velocity of the aluminum electrode, B is a three-dimensional velocity vector of average flow velocity of the chemical formation solution in a range from a surface of the aluminum electrode to a position at 10 centimeters apart therefrom in a direction perpendicular to the surface of the aluminum electrode, B−A is a three-dimensional velocity vector of relative velocity of the chemical formation solution to the aluminum electrode, and |B−A| is the absolute value of the velocity vector B−A.

5. The method for producing an electrode for an aluminum electrolytic capacitor according to claim 4, wherein
the absolute value |B−A| of the velocity vector satisfies a conditional formula:

$5 \text{ cm/s} \le |B-A| \le 30 \text{ cm/s}.$

6. The method for producing an electrode for an aluminum electrolytic capacitor according to claim 4, wherein
the absolute values |A| and |B| of the velocity vectors satisfy conditional formulae:

$0 \text{ cm/s} \le |A| \le 100 \text{ cm/s}$ $3 \text{ cm/s} \le |B| \le 100 \text{ cm/s}$ where |A| and |B| are absolute values of the velocity vectors A and B, respectively.

7. The method for producing an electrode for an aluminum electrolytic capacitor according to claim 5, wherein
the absolute values |A| and |B| of the velocity vectors satisfy conditional formulae:

$0 \text{ cm/s} \le |A| \le 100 \text{ cm/s}$ $3 \text{ cm/s} \le |B| \le 100 \text{ cm/s}$ where |A| and |B| are absolute values of the velocity vectors A and B, respectively.

8. An electrode for an aluminum electrolytic capacitor, the electrode having an aluminum electrode on which a chemical formation film having a withstand voltage of 400 V or higher is formed,
wherein the chemical formation film includes voids and the number of the voids that are exposed on a cut surface of the chemical formation film when the chemical formation film is cut and observed with a FE-SEM, is 150 voids/µm² or smaller.

9. The electrode for an aluminum electrolytic capacitor according to claim 8, wherein the number of the voids is 100 voids/µm² or smaller.

* * * * *